June 30, 1931.  H. FRÖHLICH  1,812,331
INDUCTION METER
Filed April 17, 1928
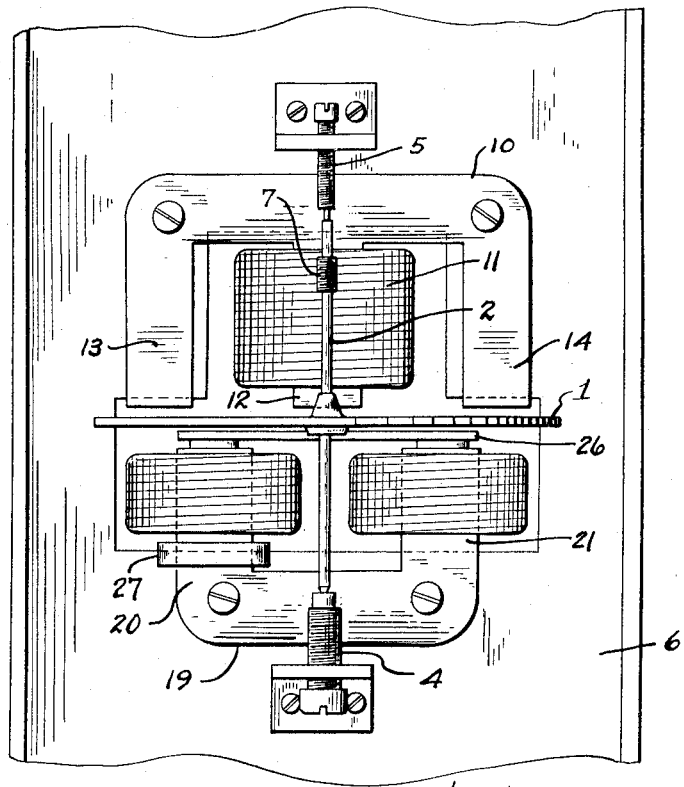
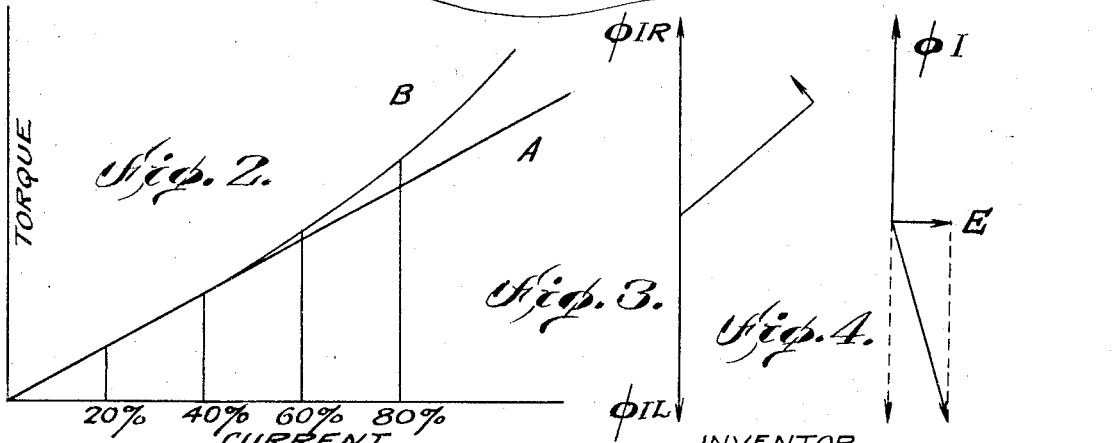

Patented June 30, 1931

1,812,331

UNITED STATES PATENT OFFICE

HANS FRÖHLICH, OF ZUG, SWITZERLAND, ASSIGNOR TO LANDIS & GYR, A-G., A JOINT-STOCK COMPANY OF SWITZERLAND

INDUCTION METER

Application filed April 17, 1928, Serial No. 270,667, and in Switzerland April 27, 1927.

The invention relates to induction meters and more particularly to novel and useful improvements in devices for preventing, correcting or minimizing errors arising out of circuit conditions or changes.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 shows an elevation of a meter mechanism embodying the invention, certain parts being shown somewhat diagrammatically;

Fig. 2 is a curve showing the relation between the normal current torque, and the torque produced by the use of applicant's invention;

Fig. 3 is a vector diagram of the fluxes of a conventional induction meter; and

Fig. 4 is a vector diagram of the fluxes of a typical meter in accordance with the present invention.

In the embodied and present preferred form of the invention, a meter disc 1 is fixed on a spindle 2, which is journaled at its ends in bearings 4 and 5, which are fixed on the meter frame 6. A worm 7, or other suitable device is carried on the spindle 2 to drive a register or like mechanism.

The pressure magnet may be of various forms, and as embodied comprises a three-armed core 10, having a pressure coil 11 wound upon the central arm 12 of the core. The other arms 13 and 14 extend from the back reach of the core 10, on either side of the coil, to form pole pieces adjacent to the disc. The current magnet likewise may be of various forms, and as embodied is located on the opposite side of the meter disc from the pressure magnet, and comprises a U-shaped core 19 having its two arms 20 and 21 extending toward the disc 1 to constitute pole pieces. Current coils 22 are wound upon the arms of the core in any suitable or convenient way.

A magnetic shunt plate or member 26, usually of iron, is arranged across the poles of the current magnet and may be varied in form for different forms of current magnet or as may be otherwise found desirable. On the current core a ring 27 of electrically conducting material is carried and this is preferably arranged on one arm of the current core behind the coil winding, as shown in the drawings.

In Figure 2, the curve A represents the driving torque of a conventional induction meter plotted against current strength expressed as percentage of full load and disregarding the braking action of the current flux on the meter disc. This curve also represents the resultant torque acting on the meter disc in a meter embodying the present improvements. Curve B represents the driving torque of a meter according to the present invention in which the torque is slightly in excess of usual torque so as to provide the necessary excess torque to overcome the braking action due to the current flux.

The driving torque of an induction meter is usually proportional to the current strength in the series coils, but the current flux normally produces a braking action on the meter disc which braking action increases with the loading of the meter and reduces the registration of the meter. Magnetic shunts for the series magnet increase the torque and compensate for the braking effect of the current flux, but this magnetic shunt disturbs the phase displacement adjustment of the meter, thereby introducing an error which is compensated for by means of an electrically conducting ring surrounding an arm of the current core, such as ring 27.

Figure 3 is a vector diagram and shows the driving current fluxes $\varphi_{IR}$ and $\varphi_{IL}$ of a meter in exact phase opposition, one of these fluxes passing upwardly through the disc, the other downwardly, and without the use of the conducting ring. After ring 27 has been applied to the series core, there results a phase displacement of the flux $\varphi_{IL}$, as shown in Figure 4, thereby producing a supplemental current torque as represented by the vector diagram, Figure 4. This current torque varies as the square of the current, but does not depend on the power-factor.

In a typical construction according to my invention, the supplemental torque produced by the ring 27 is about 2% of the main current torque at 100% of load and unity power factor.

The shunt plate 26 with an inductive load causes a drop in the characteristic performance curve. This drop, however, is compensated for by the arrangement of the electrically conducting ring 27. This ring causes a lead in the current, which with an inductive load acts more powerfully than with a purely ohmic load. By this means, the result can be obtained that the characteristic performance curves are similar for all kinds of load and are thus practically eliminable.

The invention in its broader aspects is not limited to the specific mechanisms shown and described but departures may be made therefrom within the scope of the accompanying claims without departing from the principles of the invention and without sacrificing its chief advantages.

What I claim is:—

1. An induction meter including a meter disc and driving mechanism therefor including a driving coil and core, a magnetic shunt plate cooperating with pole pieces of the core and a single ring of electrically conducting material encircling said core on the opposite side of the coil from said shunt plate.

2. An induction meter including a meter disc and driving mechanism therefor including a pressure coil and core, a series coil and core on the opposite side of the disc from the pressure magnet, a magnetic shunt plate between the pole pieces of the series magnet and the meter disc, and a ring of electrically conducting material encircling the current core on the opposite side of the coil from said magnetic shunt plate.

3. An induction meter including in combination a meter disc and driving mechanism therefor including a series coil and core, a magnetic shunt plate between the pole pieces of the series magnet and a ring of electrically conducting material surrounding a coil carrying arm of the series core and compensating for the error caused by the magnetic shunt plate.

In testimony whereof, I have signed my name to this specification.

HANS FRÖHLICH.